United States Patent [19]

Chang

[11] Patent Number: 5,064,798

[45] Date of Patent: Nov. 12, 1991

[54] CATALYST FOR OLEFIN POLYMERIZATION

[75] Inventor: Main Chang, Houston, Tex.

[73] Assignee: Exxon Chemical Patents Inc., Linden, N.J.

[21] Appl. No.: 492,513

[22] Filed: Mar. 12, 1990

Related U.S. Application Data

[62] Division of Ser. No. 234,231, Aug. 19, 1988, Pat. No. 4,935,394.

[51] Int. Cl.$^5$ .............................................. C08F 4/649
[52] U.S. Cl. .................................... 502/111; 502/104; 502/112; 502/117; 502/119; 502/120; 502/128; 502/133; 502/134; 526/124
[58] Field of Search ............... 502/104, 111, 112, 117, 502/119, 120, 128, 133, 134

[56] References Cited

U.S. PATENT DOCUMENTS

| | | | |
|---|---|---|---|
| 3,993,588 | 11/1976 | Thukral | 252/429 C |
| 4,081,589 | 3/1978 | Peters et al. | 526/97 |
| 4,175,170 | 11/1979 | Schweier et al. | 526/125 |
| 4,317,897 | 3/1982 | Herrman et al. | 526/116 |
| 4,328,121 | 5/1982 | Capshew | 502/117 X |
| 4,379,758 | 4/1983 | Wagner et al. | 252/429 B |
| 4,420,417 | 12/1983 | LeBrasseur | 502/125 X |
| 4,427,573 | 1/1984 | Miles et al. | 502/111 |
| 4,452,912 | 6/1984 | Bahidir et al. | 502/111 |
| 4,458,027 | 7/1984 | Berge et al. | 502/119 X |
| 4,472,521 | 9/1984 | Band | 502/119 X |
| 4,526,941 | 7/1985 | Sakurai et al. | 502/127 X |
| 4,562,168 | 12/1985 | Lee | 502/119 X |
| 4,564,606 | 1/1986 | Best | 502/117 |
| 4,607,019 | 8/1986 | Best | 502/119 X |
| 4,626,520 | 12/1986 | Best | 502/119 X |
| 4,643,119 | 2/1987 | Langston et al. | 112/421 |

FOREIGN PATENT DOCUMENTS 10741 5/1980 European Pat. Off. .
2543235 4/1977 Fed. Rep. of Germany .
2847758 5/1980 Fed. Rep. of Germany .

Primary Examiner—Patrick P. Garvin
Attorney, Agent, or Firm—Myron B. Kurtzman; T. Dean Simmons

[57] ABSTRACT

This invention provides new supported catalyst compositions for the polymerization of 1-olefins, together with processes for preparing and using the catalysts. The catalyst compositions include two catalyst components. The first catalyst component is formed by reacting a halogen-containing compound of the formula: $H_aM^1X^1_bR^1_{(c-b-a)}$ wherein $M^1$ is boron, carbon, silicon or mixtures thereof; $X^1$ is Cl, Br or mixtures thereof; $R^1$ is a hydrocarbyl or alkoxy radical; with a mixture produced by contacting a finely divided porous inorganic oxide support in an inert solvent with a solution made by combining a magnesium dihydrocarbyloxide dissolved in an inert solvent, and of the formula: $Mg(OR^2)_2$ wherein $R^2$ is a hydrocarbyl radical, with a transition metal hydrocarbyloxide of the formula: $M^2(OR^3)_y$ wherein $M^2$ is a transition metal from Group IVB, VB, and VIB of the Periodic Table; and $R^3$ is a hydrocarbyl radical. The second catalyst component of the new catalyst compositions is an organometal compound of the formula: $M^3R^4_{e-f}X_f$ wherein $M^3$ is aluminum, magnesium, zinc or mixtures thereof; $R^4$ is a saturated hydrocarbyl radical; X is hydrogen, halogen or an alkoxy. In a preferred aspect of the invention, the solution made by combining the magnesium dihydrocarbyloxide, dissolved in an inert solvent, with the transition metal hydrocarbyloxide, is reacted with a carboxylic acid derivative, of the formula $R^5COZ$, wherein $R^5$ is a hydrocarbyl radical and Z is a halogen atom or an alkoxy radical. An important characteristic of this invention is that the new catalyst compositions give significantly higher hydrogen and comonomer responses and greater productivity with larger average particle size and higher bulk density than with at least certain state of the art catalysts.

20 Claims, No Drawings

CATALYST FOR OLEFIN POLYMERIZATION

This application is a division of application Ser. No. 234,231, filed Aug. 19, 1988 and now U.S. Pat. No. 4,935,394.

BACKGROUND OF THE INVENTION

1. Field of the Invention

This invention relates to a supported catalyst composition for polymerization of 1-olefins, to the preparation of such catalysts, and to a process of polymerizing 1-olefins using such catalysts

2. Description of the Prior Art

In the polymerization of 1-olefins to produce polyethylene, polypropylene and copolymers, such as ethylene-butene copolymers, considerable effort has been expended to improve catalyst productivity while at the same time achieving a desired set of polymer properties characterized by particle size distribution, molecular weight, molecular weight distribution, and bulk density, characteristics all important in the handling, processing use and storage of the product. Particularly in the production of polyethylene and ethylene-butene copolymers, sensitivity of the catalyst to hydrogen and comonomer are significant in control of the molecular weight and comonomer incorporation to achieve desired polymer characteristics.

Previously, workers in the field have used finely divided porous inorganic oxides, such as silica or silica-alumina, as a catalyst support (for example, see U.S. Pat. Nos. 3,993,588 and 4,452,912) or as a catalyst diluent (U.S. Pat. No. 4,081,589).

In variant syntheses of catalysts, organic acid halides have been mentioned for use as precipitating agents or as electron donors, and chlorosilanes have been reacted with organomagnesium compounds.

More specifically, U.S. Pat. No. 4,328,121 teaches preparation of 1-olefin polymerization catalysts by a method which includes using aluminum alkyls or aluminum alkylhalides as a precipitating agent for a hydrocarbon solution of a titanium alkoxide and a magnesium alkoxide. Organic acid halides, including benzoyl chloride, are among those listed as being suitable precipitating agents.

U.S. Pat. No. 4,420,417 teaches preparation of an ethylene polymerization catalyst by reacting a titanium alkoxide and a magnesium alkoxide in a hydrocarbon solvent with acetylchloride until the solvent phase has no chloride or titanium, after which the by-product ester is removed by distillation and the hydrocarbon suspension is activated by addition of an alkylaluminum halide. Organic acid halides having an alkyl group of 1 to 12 carbon atoms are described as suitable and as generically exemplified by the acetylchloride.

U.S Pat. No. 4,379,758 teaches preparation of ethylene polymerization catalysts by combining alkylaluminum halide treated particulate silica with magnesium chloride and titanium chloride dissolved in an ether as an electron donor solvent, followed by drying the mixture, then slurrying the dried mixture with a hydrocarbon solvent and reacting the slurried mixture with a boron halide, followed by another drying step and then treatment of the dried boron halide treated impregnated silica with an aluminum alkylhalide. Magnesium diethyloxide is said to be a suitable substitute for the magnesium chloride. Esters of aliphatic and aromatic carboxylic acids are said to be suitable electron donor solvents.

U.S. Pat. 4,175,170 teaches the preparation of 1-olefin polymerization catalysts by impregnating finely divided porous silicon dioxide with an aluminum alkyl or aluminumalkylhalide in a hydrocarbon solvent, removal of the solvent to recover the solid phase, combining the solid phase with a magnesium compound in a suitable solvent, recovering the resultant solid phase, combining it with a titanium alkoxy-halide or titanium tetrahalide in a hydrocarbon solvent, then recovering the final solid phase product as the catalyst. Listed among magnesium compounds as suitable are magnesium dihydrocarbyloxides.

U.S Pat. No. 4,526,941 teaches preparation of 1-olefin polymerization catalysts by reacting a chlorosilane and an organomagnesium compound (typically formed by reacting an alkylmagnesium halide and a trialkylaluminum, but which, it is said, may be a magnesium alkoxide), then combining that reaction product first with an electron donor ester of a nitrogen- or sulfur-containing heterocyclic acid or an ester of a hydrocarbylcarboxylic acid, followed next by a titanium compound, in some instances a titanium alkoxide. Optionally, the organomagnesium compound may be treated with an electron donor (halides and esters of hydrocarbylcarboxylic acids are mentioned) before reacting the product of that treatment with a chlorosilane. The chlorosilane reaction with either the treated or untreated organomagnesium compound may be conducted in the presence of a silica or silica-alumina support.

SUMMARY OF THE INVENTION

This invention provides new supported catalyst compositions for the polymerization of 1-olefins, together with processes for preparing and using the catalysts.

The catalyst compositions include two catalyst components. The first catalyst component is formed by reacting a halogen-containing compound of the formula:

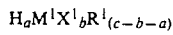

wherein
$M^1$ is boron, carbon, silicon or mixtures thereof;
$X^1$ is Cl, Br or mixtures thereof;
$R^1$ is a hydrocarbyl or alkoxy radical having 1 to 20 carbon atoms;
"a" is zero when $M^1$ is boron and is a number greater than zero and less than or equal to 2 when $M^1$ is silicon or carbon;
"b" is a number equal to or greater than 1 when $M^1$ is silicon or carbon;
and "c" is the maximum valency of the element $M^1$;
with a mixture produced by contacting a finely divided porous inorganic oxide support in an inert solvent with a solution made by combining a magnesium dihydrocarbyloxide dissolved in an inert solvent, and of the formula:

wherein
$R^2$ is the same or different and is a hydrocarbyl radical containing from 1 to 20 carbon atom,
with a transition metal hydrocarbyloxide of the formula:

$$M^2(OR^3)_y$$

wherein $M^2$ is a transition metal from Group IVB, VB, and VIB of the Periodic Table;

"y" is the valency of the metal $M^2$; and $R^3$ is the same or different and is a hydrocarbyl radical containing 1 to 20 carbon atoms.

The second catalyst component of the new catalyst compositions is an organometal compound of the formula:

$$M^3R^4_{e-f}X_f$$

wherein $M^3$ is aluminum, magnesium, zinc or mixtures thereof;

$R^4$ is a saturated hydrocarbyl radical having from 1 to 14 carbon atoms;

X is hydrogen, halogen or an alkoxy having from 1 to 14 carbon atoms;

"e" is the valency of the metal $M^3$; and

"f" is a number from zero to $e-1$.

In a preferred aspect of the invention, the solution made by combining the magnesium dihydrocarbyloxide, dissolved in an inert solvent, with the transition metal hydrocarbyloxide, is reacted with a carboxylic acid derivative, such as a halide or an ester, and the reaction product is then combined with the porous inorganic oxide support in inert solvent before reacting with the halogen-containing compound. The carboxylic acid derivative so used is one of the formula $R^5COZ$, wherein $R^5$ is a hydrocarbyl radical having from 1 to 20 carbon atoms, and Z is a halogen atom or an alkoxy radical having from 1 to 20 carbon atoms.

In one aspect of the invention, the magnesium dihydrocarbyloxide employed in the preparation of the catalyst composition is itself prepared and used for combination with the transition metal hydrocarbyloxide without intermediate separation and drying to recover the magnesium dihydrocarbyloxide.

An important characteristic of this invention is that the new catalyst compositions give significantly higher hydrogen and comonomer responses and greater productivity with larger average particle size and higher bulk density than with at least certain state of the art catalysts.

Another important characteristic of the catalyst compositions prepared according to this invention is that the process of preparation may be conducted without intermediate drying and separation steps. This is significant because the number of drying steps is an important cost factor which can be determinate in whether a catalyst composition is commercially viable.

DETAILED DESCRIPTION OF THE INVENTION

Each of the component materials and the reaction conditions employed for the preparation of the catalyst are now described in detail.

Magnesium dihydrocarbyloxide compositions which are used in preparing the first mentioned catalyst component are of the formula:

$$Mg(OR^2)_2$$

wherein $R^2$ is the same or different and is a hydrocarbyl radical containing from 1 to 20 carbon atoms;

Examples of hydrocarbyl radicals are from groups including alkyl groups such as methyl, ethyl, propyl, butyl, pentyl, hexyl and decyl groups; cycloalkyl groups such as the cyclohexyl group, aryl groups such as the phenyl groups and combination groups such as alkylaryl groups, arylalkyl groups, for example and toluyl groups, and alkylcycloalkyl groups. Of these groups, alkyl groups are preferred and more preferably, alkyl groups in which the carbon number is 6 or greater. Especially suitable are magnesium dialkoxides such as magnesium di-hexyloxide, and magnesium di-2-ethylhexyloxide. Other suitable examples include magnesium dieicosyloxide, magnesium dicyclohexyloxide, magnesium diphenoxide, magnesium dibenzyloxide and the like.

In the transition metal hydrocarbyloxide of the formula:

$$M^2(OR^3)_y$$

wherein $M^2$ is a transition metal selected from Group IVB, VB, VIB of the Periodic Table;

"y" is the maximum valency of the metal $M^2$, $R^3$ is the same or different and is a hydrocarbyl radical containing 1 to 20 carbon atoms;

The transition metal $M^2$ suitably is titanium, vanadium, zirconium or chromium. Excellent results are obtained with titanium compounds and they are preferred. Some of the transition metal compounds suitable for use in the invention include, for example, titanium tetrahydrocarbyloxides, zirconium tetrahydrocarbyloxides.

The titanium tetrahydrocarbyloxides are the preferred titanium compounds because they produce excellent results and are readily available. Suitable titanium tetrahydrocarbyloxide compounds include those expressed by the general formula $Ti(OR^2)_4$, wherein each $R^2$ is the same as defined above and is individually selected from an alkyl, cycloalkyl, aryl, alkylaryl, and arylalkyl hydrocarbon radical containing from about 1 to 20 carbon atoms per radical, each of which can be the same or different. Titanium tetrahydrocarbyloxides in which the hydrocarbyl group contains from about 1 to about 10 carbon atoms per radical are most often employed because they are more readily available. Suitable titanium tetrahydrocarbyloxides include, for example, titanium tetramethoxide, titanium dimethoxydiethoxide, titanium tetraethoxide, titanium tetrapropoxide, titanium tetraisopropoxide, titanium tetra-n-butoxide, titanium tetra isobutoxide, titanium tetra-tertbutoxide, titanium tetrapentoxide, titanium-tert-pentoxide, titanium tetrahexyloxide, titanium tetra n-heptoxide, titanium tetra-n-octoxide, titanium tetradecyloxide, titanium tetraeicosyloxide, titanium tetracyclohexyloxide, titanium tetrabenzyloxide, titanium tetra-p-tolyloxide, and titanium tetraphenoxide, and mixtures thereof.

Of the titanium tetrahydrocarbyloxides, titanium tetraalkoxides are generally preferred, and titanium tetraisobutoxide or tetrabutyloxide are particularly preferred because of the excellent results obtained employing this material and its general availability at a reasonable cost.

The molar ratio of the magnesium dihydrocarbyloxide to the transition metal compound can be selected over a relatively broad range. Generally, the molar ratio is within the range of about 0.1 to about 100, however, the most common molar ratios are within the range of about 0.5 to about 50. When titanium tetrahydrocarbyloxide and magnesium hydrocarbyloxides are employed to form a composition of matter of the invention, a molar ratio of magnesium to titanium of about 0.5 to about 50 is especially suitable.

In accordance with the invention, the magnesium dihydrocarbyloxide and the transition metal hydrocarbyloxide are brought together in an inert solvent essentially free of water under a dry oxygen-free nitrogen atmosphere. The term "inert" means that the solvent does not chemically react with the components dissolved or mixed in the solvent or with products formed in the solvent. Such solvents include hexane, heptane, cyclohexane, methylcyclohexane, toluene, xylenes, benzene, and the like. The magnesium dihydrocarbyloxide and the transition metal hydrocarbyloxide suitably may be brought together by mixing the latter with a slurry of the former and adding solvent followed by heating, or by dissolving the magnesium dihydrocarbyloxide in the inert solvent and then adding the transition metal hydrocarbyloxide in liquid form to that solution Generally, the amount of solvent used is within a broad range, suitably from about 5 to about 100 ml per gram of magnesium dihydrocarbyloxide. The dissolution suitably is at room temperature without supplemental heating or cooling, but heating or cooling can be within a broad range from about 15° C. to the boiling point of the solvent.

As in an aspect of this invention, and alternative to the foregoing methods for combining the magnesium dihydrocarbyloxide and the transition metal hydrocarbyloxide, the magnesium dihydrocarbyloxide is produced in situ in the inert solvent, and the transition metal hydrocarbyloxide in liquid form is then combined with the magnesium dihydrocarbyloxide so produced. In this latter aspect, a magnesium dihydrocarbyl compound, suitably a magnesium dialkyl compound, for example, ethylbutyl magnesium, in an inert solvent, suitably heptane, is reacted with two mol equivalents of a hydrocarbyl alcohol, suitably an alkyl alcohol, preferably an alkyl alcohol in which the hydrocarbyl group has 6 or more carbon atoms, for example, 2-ethylhexanol. The reaction is highly exothermic. Since heat is evolved, the hydrocarbylalcohol is added to the dissolved magnesium hydrocarbyl compound at a rate to maintain a desired temperature range.

The solution of dissolved magnesium dihydrocarbyloxide and transition metal hydrocarbyloxide is combined with a finely divided porous inorganic oxide support material, suitably a finely divided particulate microspheroidal silica or silica composite such as silica-aluminum. Silicas and silica aluminas having a mean particle diameter in the range from 10 to 200 microns, preferably from 20 to 200 microns, preferably from 20 to 100 microns; a pore volume of 0.1 to 5.0 cm$^3$/g, preferably from about 0.5 to 3.0 cm$^3$/g; and a surface area of from 10 to 1,000 m$^2$/g, preferably from about 50 to 600 m$^2$/g, are suitable. Preferably the oxide support is 99 percent or better SiO$_2$. A suitable silica support is Davison 948 silica gel available from W. R. Grace.

The support material is substantially dry when used. Drying is suitably accomplished by heating for several hours at a temperature of 500° C. (less if drying is under reduced pressures). The porous oxide support and the solution of dissolved magnesium dihydrocarbyloxide and transition metal hydrocarbyloxide may be combined by adding that solution to a slurry of the oxide support in an inert solvent for the magnesium dihydrocarbyloxide and the transition metal hydrocarbyloxide, or the support may be added to a solution of the magnesium dihydrocarbyloxide and transition metal hydrocarbyloxide in an inert solvent.

Suitably, about 1 to about 10,000 parts by weight of the oxide support to weight of the transition metal are employed.

The oxide support is allowed to remain in the inert solvent in contact with the dissolved titanium metal hydrocarboxyloxides and magnesium dihydrocarbyloxide at a temperature and for a time effective for the hydrocarbyloxide compound to impregnate the carrier Suitably this may be at ambient temperature for about a half hour, but heating may be employed.

Preferably, before the solution of the dissolved magnesium dihydrocarbyloxide and transition metal hydrocarbyloxide is combined with the particulate porous inorganic oxide support, the solution is reacted with a carboxylic acid derivative, dissolved in an inert solution, and having the formula $$R^5COZ,$$

wherein
$R^5$ is a hydrocarbyl radical having from 1 to 20 carbon atoms; and
Z is a halogen atom or an alkoxy radical having from 1 to 20 carbon atoms.

$R^5$ in this formula is an aliphatic, alicyclic or aromatic hydrocarbon group. Exemplary groups include methyl, ethyl, propyl, butyl, amyl, hexyl, heptyl, octyl, nonyl, decyl, cetyl, stearyl, 2-ethylhexyl, cyclopentyl, cyclohexyl, phenyl, cresyl and naphthyl. Halogen atoms include chloride bromine and iodine, and of these halogen atoms, chlorine is preferred. Suitable carboxylic acid derivatives include acid halides, such as acetyl chloride, propionyl chloride, proponyl fluoride, butylchloride, succinoylchloride, dodecanoyl chloride, 3-cyclopentylpropionyl chloride, 2-naphthoyl chloride, benzoyl bromide, benzoyl chloride, toluylchloride and the like. Suitable esters include methyl or ethyl formate, methyl, ethyl or propyl acetate, methyl, ethyl, propyl or butyl propionate, ethyl butyrate, ethyl valerate, ethyl caproate, ethyl n-heptanoate, dibutyl oxalate, ethyl succinate, ethyl malonate, dibutyl maleate, methyl or ethyl acrylate, methyl methacrylate, methyl, ethyl, propyl or butyl benzoate, methyl, ethyl, propyl, butyl or amyl toluate, and methyl or ethyl p-ethylbenzoate. Benzoyl chloride is a preferred carboxylic acid derivative.

The amount of the carboxylic acid derivative used is such that the molar ratio of the carboxylic acid derivative to the total of magnesium dihydrocarbyloxide and transition metal hydrocarbyloxide suitable is from about 0.001 to about 10, preferably from about 0.01 to 3, and most preferably about 0.9:1.

The hydrocarboxylic acid derivative is combined with the solution of magnesium dihydrocarbyloxide and transition metal hydrocarbyloxide suitably by adding the derivative to the solution. The reaction is exothermic and may be controlled by the rate of addition and applying cooling or heating. The reaction may be allowed to occur at ambient temperature. Heating may be controlled within the range from about 15° C. to the boiling point of the solvent. A homogeneous solution is formed as the reaction ends. The solution containing the reaction product is then combined with the slurry of particulate porous inorganic oxide and the reaction product is permitted to impregnate the oxide, as already has been described.

To the slurry mixture of impregnated oxide support is then added the halogen-containing compound of the formula:

$$H_aM^1X^1_bR^1_{(c-b-a)}$$

wherein $M^1$ is boron, carbon, silicon or mixtures thereof; $X^1$ is a halogen;

$R^1$ is a hydrocarbyl or alkoxy radical having 1 to 20 carbon atoms;

"a" is zero when $M^1$ is boron and is a number greater than zero and less than or equal to 2 when $M^1$ is silicon or carbon;

"b" is a number equal to or greater than 1 when $M^1$ is boron and greater than 1 when $M^1$ is silicon or carbon; and "c" is the maximum valency of the element $M^1$.

$R^1$ in this formula may be an aliphatic, alicyclic or aromatic hydrocarbon group. Exemplary groups include methyl, ethyl, propyl, butyl, amyl, hexyl, haptyl, octyl, nonyl, decyl, cetyl, stearyl, 2-ethylhexyl, cyclopentyl, cyclohexyl, phenyl, cresyl and naphthyl, Halogen atoms include chlorine, bromine, iodine, and fluorine, and of these halogen atoms, chlorine is preferred. Where $M^1$ is carbon, the formula describes suitable compounds which include Freon-11, chloroform, carbon tetrachloride and other halogen-containing hydrocarbons with from 1 to 20 carbon atoms, preferably from 1 to 6 carbon atoms. Where $M^1$ is boron, the formula describes the boron halide compounds useful individually or in combination, including boron trichloride, boron tribromide, boron ethyldichloride, boron ethyloxide dichloride, boron diethyloxide chloride, boron hexyldichloride, boron hexyloxide dichloride, boron benzyldichloride, boron phenyldichloride, and boron diphenyloxide chloride. Boron trichloride is the preferred boron compound. Where $M^1$ is silicon, the formula describes chorosilane compounds useful individually or in combination, which include trichlorosilane, methyldichlorosilane, ethyldichlorosilane, n-propyldichlorosilane, iso-propyldichlorosilane, n-butyldichlorosilane, benzyldichlorosilane, parachlorobenzyldichlorosilane, toluyldichlorosilane, naphthalyldichlorosilane, vinyldichlorosilane, allyldichlorosilane, monomethylchlorosilane, diethylchlorosilane, methyl isopropylchlorosilane, methylbenzylchlorosilane, and dibenzylchlorosilane. Trichlorosilane is the preferred chlorosilane compound.

The amount of halogen-containing compound used is such that the molar ratio of it to the total of magnesium dihydrocarbyloxide and transition metal hydrocarbyloxide broadly is from about 100 to about 0.1. Suitably the molar ratio is from about 10 to 1.0.

The reaction of the halogen-containing compound with the slurry reaction mixture is exothermic the halogen-containing compound at a rate over a period of time adequate to control the reaction to completion. suitably the reaction is permitted to occur at ambient temperature for about a half-hour.

Following the reaction of the slurry mixture with the halide containing compound, there is added to the slurry reaction mixture an organometallic compound, dissolved in an inert solvent, and of the formula:

$$M^4R^4_{e-f}X_f$$

wherein $M^4$ is selected from aluminum magnesium, zinc or mixtures thereof;

$R^4$ is a saturated hydrocarbyl radical having from 1 to 14 carbon atoms;

X is hydrogen, a halogen or an alkoxy radical;

"e" is the valency of the metal $M^4$; and

"f" is a number from zero to $e-1$.

The organometallic compounds include organoaluminum compounds, organomagnesium compounds and organozinc compounds. Of these organometallic compounds, organoaluminum compounds are preferred.

Exemplary organoaluminum compounds include trialkylauminums such as trimethylaluminum, triethylaluminum, tri-n-propylaluminum, triisopropylaluminum, tri-n-butylaluminum, triisobutylaluminum, tri-n-hexylaluminum tri-n-octylaluminum, tri-n-decylaluminum, tri-n-dodecyclaluminum, trihexadecyclaluminum and aluminum isoprenyl; dialkylaluminum halides such as dimethylàluminum chloride, diethylaluminum chloride di-n-propylaluminum chloride, di-n-butylaluminum chloride, diisobutylaluminum chloride, di-n-hexylaluminum chloride, diisohexylaluminum chloride, di(2-ethylhexyl)aluminum chloride, di-n-dodecyclaluminum chloride, methylisobutylaluminum chloride, ethylisobutylaluminum chloride; aluminum alkylsequichloride such as methylaluminum sesquichloride, ethylaluminum sesquichloride, isobutylaluminum sesquichloride; aluminum alkyldichlorides such as methylaluminum dichloride, ethylaluminum dichloride, isobutylaluminum dichloride; diethylaluminum bromide; aluminum trialkoxides, such as aluminum triethoxide, aluminum triisopropoxide, aluminum dialkoxychlorides, aluminum alkoxydichlorides, alkylaluminum dialkoxides, such as ethyl aluminumdiethoxide, and dialkylaluminum alkoxides, such as diethylaluminumethoxide. Of these organoaluminum compounds, trialkylaluminums are preferred and of the trialkylaluminum tri-n-hexylaluminum is most preferred.

The molar ratio of the organometallic compound to the transition metal hydrocarbyloxide generally can be selected over a broad range, suitably from 0.1 to about 10, preferably from about 0.5 to about 5:1.

The organometallic compound in an inert solvent is combined, suitably by addition, with the slurry solution resulting upon addition of the halogen-containing compound to the slurry reaction mixture. The slurry solution is mixed, suitably by stirring or other agitation, for from about 0.5 to 5 hours, suitably at temperatures in the range from 15° C. to the boiling point of the solvent for a period of time adequate to assure that reaction is complete. Generally, reaction is complete after one-half hour at ambient temperature.

The resultant slurry may be charged directly to the polymerization reaction zone or may be dried and stored under a dry inert gas such as nitrogen or argon for future use.

The catalyst compositions of this invention are useful in the production of homopolymers and and copolymers of $C_2$ to $C_8$ 1-olefins, preferably the 1-olefins, preferably the 1-olefins ethylene and propylene, and especially to prepare copolymers of 90 mol percent or greater ethylene and 10 mol percent or less of one or more $C_3$ to $C_8$ 1-olefins, preferably propylene, butene-1, pentene-1, hexene-1, 4-methylpentene-1.

Polymerization may be conducted by suspension, liquid or gas phase processes Suspension polymerization may be accomplished at a temperature in the range from about 50° C. to about 100° C., suitably about 85° C., under total pressures in the range from about 50 psia to about 1000 psia, suitably about 50–500 psia. A polymerization medium suitably an aliphatic hydrocarbon such as hexane or heptane, is provided in a dried reactor and under an inert atmosphere. The reactor may be charged with an organoaluminum compound, for example, trialkylaluminums (such as trimethylaluminum, triethylaluminum, tri-n-propyl-aluminum, triisopropylaluminum, tri-n-butyl-aluminum, triisobutylaluminum, tri-n-hexylaluminum, tri-n-octylaluminum, tri-n-decylaluminum, tri-n-dodecyclaluminum, trihexadecyclaluminum and aluminum isoprenyl), dialkylaluminum halides (such as dimethylaluminum chloride, diethylaluminum chloride, di-n-propylaluminum chloride di-n-butylaluminum chloride, diisobutylaluminum chloride, di-n-hexylaluminum chloride, diisohexylaluminum chloride, di(2-ethylhexyl)aluminum chloride, di-n-dodecylaluminum chloride, methylisobutylaluminum chloride, ethylisobutylaluminum chloride), aluminum alkylsequichloride (such as methylaluminum sesquichloride, ethylaluminum sesquichloride, isobutylaluminum sesquichloride), aluminum alkyldichlorides (such as methylaluminum dichloride, ethylaluminum dichloride, isobutylaluminum dichloride), aluminum trialkoxides, (such as aluminum triethoxide, aluminum triisopropoxide, aluminum dialkoxychlorides, aluminum alkoxydichlorides), alkylaluminum dialkoxides, (such as diethylaluminumethoxide) as cocatalyst and hydrogen to cause chain transfer and control molecular weight under conventional methodology, and if a copolymer is wanted, the desired comonomer also may be charged into the reactor. The 1-olefin is introduced, pressurizing the system to the desired level, and the catalyst is charged. The liquid phase polymerization is more suitable for the higher molecular weight 1-olefins which have higher boiling points, for example propylene or 1-butene, using the liquid olefin as the polymerization medium at temperatures in the range from about 50° C. to about 300° C. and pressures in the range from about 100 psia to about 1000 psia. Gas phase polymerization most advantageously is accomplished in a fluidized bed reactor, suitably at temperatures in the range from 50° C. to about 100° C. at pressures from about 50 psia to 500 psia.

Ethylene homopolymers and copolymers prepared with the catalyst compositions of this invention may have a melt index from about 0.001 dg/min up to about 1000 dg/min and a melt index ratio of from about 20 to about 300. The products prepared with the catalysts of this invention also have bulk densities at least as good as those products made with prior art catalysts.

The resin products are suitable for conventional molding, and other applications.

As previously mentioned, this invention provides a facile method for producing a supported magnesium-titanium complex catalyst systems which exhibits a combination of desirable catalyst properties not likewise exhibited by various state of the art supported magnesium-titanium complex catalyst systems which are more difficult to produce. In accordance with this invention the catalyst system is produced by liquid phase reactions with liquid reagent solutions without the need for intermediate drying or separation steps. Chief among the desirable properties exhibited is the ability of catalyst systems of this invention to polymerize the slurry or gas phase production of high bulk density polymer granules at a high rate of catalyst productivity. The high productivity rate enhances the rate at which polymer product can be produced and eliminates the need to subject the product polymer to a deashing operation. The high bulk density of the product polymer granules facilitates the storage, handling and transfer of the product polymer granules making such product polymer a more desirable feed material for subsequent fabricating operations. An additional benefit obtained with catalyst systems of this invention is its capability to produce product polymer granules to a larger average particle size (APS), and when used for production of copolymers of ethylene with another α-olefin monomer, its enhanced comonomer response Further, catalyst systems of this invention exhibit an enhanced hydrogen response for control of the molecular weight of the produced polymer product.

EXAMPLES

The present invention will now be illustrated in specific detail with reference to numerous examples, but the examples are to be understood as illustrative only and not as limiting the invention. The examples which follow compare the properties of catalyst systems of the invention with those of a prior art catalyst system as described in U.S. Pat. No. 4,564,606, particularly Example 3 thereof, which has heretofore been commercially employed for the production of homo-and copolymers of ethylene. The comparative prior art catalyst system is exemplified by Example A.

In the examples which follow, the melt index (MI) and melt index ratio (MIR) were determined in accordance with ASTM Test D-1238 (2.1 kg weight at 190° C.). The bulk density was determined by allowing approximately 120 cc of resin to fall from the bottom of a polyethylene funnel across a gap of 1 inch into a tared 100 cc plastic cylinder (2.6 cm in diameter by 19.0 cm high). The funnel bottom was covered with a piece of cardboard until the funnel was filled with the sample. The entire sample was then allowed to fall into the cylinder. Without agitating the sample, excess resin was scraped away so that the container was completely filled without excess. The weight of the resin in the 100 cc cylinder was determined. This measurement was repeated 3 times and the average value recorded.

Example A

Catalyst Preparation

Into a vial containing 20 ml of hexane was injected 10 ml of butylethylmagnesium (BEM) (6.8 mmoles Mg). To this solution was added 0.5 ml (6.8 mmoles) of n-butanol followed by reaction at room temperature for 1.5 hours. A second vial containing 3.5 grams of silica gel (previously dried at 500° C.) and 20 ml of hexane was connected to a chlorine gas cylinder, pressurized to 7.5 psig and allowed to react for one hour at room temperature. At the completion of this time period, the vial was purged with nitrogen to remove residual chlorine. The contents of the first vial were then syringed into the vial containing the chlorinated silica and allowed to react for one hour at room temperature. 6.8 mmoles of benzoyl chloride was added and stirring continued at room temperature for one hour. TiCl$_4$ was added (2.3 mmoles Ti) and reacted at room temperature for one hour. The catalyst was then filtered. After washing with hexane, the catalyst was dried in vacuo. The final catalyst was cream colored and found to contain 1.13 wt % TI.

Polymerization

To a 2.2 liter reactor there was added 800 cc of hexane, 150 mg of the titanium containing solid catalyst component, triisobutyl aluminum cocatalyst in an amount so as to provide an aluminum to titanium ratio of 50 mmoles. The vessel was pressured to 30 psig with $H_2$, the vessel was thereafter pressured to 150 psig with ethylene. The vessel was heated to 80° C. and polymerization was maintained for 40 minutes. The polymerization reaction yielded 259 g of polyethylene product granules having a bulk density of 25 lbs/ft$^3$ (0.40 g/cc).

Example AA

A titanium containing product was prepared identically as in Example A except that tri-n-hexylaluminum (TNHAL) in an inert solvent (hexane or isopentane) was added to the titanium containing product in an amount sufficient to provide the catalyst system with an aluminum to titanium molar ratio of from 2:1 to 4:1 before the catalyst was dried.

The resulting supported catalyst composition was utilized to produce a butene-1 LLDPE as follows. A continuous gas fluidized bed reactor was used to carry out the polymerization. The catalyst was injected continuously into the fluidized bed reactor at 85° C. Ethylene, 1-butene, hydrogen, and nitrogen were continuously supplied to the reactor to provide a total pressure of 150 psi. A molar ratio of 1-butene to ethylene of 0.42:1 and a molar ratio of hydrogen to 1-butene of 0.070:1 were maintained during the polymerization. The reaction was run continuously and smoothly for 36 hours at a space time yield of 6 lb/hour/ft$^3$ while producing a butene-1 LLDPE product having a 0.918 g/cc gradient density, 1.0 MI, 29.0 MIR, and 27.8 lb/ft$^3$ (0.4453 g/cc) bulk density. The productivity of the catalyst was 2500 lb polymer/lb catalyst while producing a granular polymer product having an average particle size of 0.027 inch.

Example 1

Preparation of Catalyst Composition, First Method

A 4.6 mmole aliquot of magnesium di-2-methylpentyloxide in heptane solution (0.96M) and 5.9 mmole of liquid titanium tetra isobutoxide were mixed in a vial to form a homogeneous solution. This solution was injected into a vial containing 30 cc of hexane and 3.5 grams of Davison 948 silica gel previously dried at 500° C. The resulting mixture was allowed to react at room temperature for 30 minutes. The supernatant of the mixture was decanted. A 19.7 mmole aliquot of trichorosilane liquid was injected into the vial and the mixture was allowed to react at room temperature for 30 minutes. Finally, a 1.4 mmole aliquot of tri-n-hexylaluminum ("TNHAL") in heptane solution (0.72M) was added to the mixture at room temperature and the mixture was stirred for 30 minutes. The mixture turned brown after the addition of the TNHAL. The product was dried by first purging with nitrogen, followed by evaporation under vacuum.

Polymerization A

A 2.2 liter autoclave was used for the polymerization reaction. The freshly cleaned reactor was heated to 60° C. and flushed with purified nitrogen for 30 minutes. It was cooled to room temperature and 850 cc of dried, oxygen-free hexane was added. A 0.4 aliquot of triethylaluminum ("TEAL") in heptane solution (1.67M) was injected into the reactor, as a cocatalyst. The reactor was heated to 85° C. The amounts of 120 mmole of $H_2$ and 20 cc of 1-butene were added to the reactor. After the addition of hydrogen the reactor was pressurized to 150 psig with ethylene. The reactor was started by injecting 50 mg of the catalyst into the reactor. The reaction was allowed to proceed for 40 minutes. At the end of the reaction period, 187 grams of resin was obtained having an MI of 1.04 dg/min and an MIR of 30.6.

Polymerization B

Polymerization A was repeated except that 80 mmole of $H_2$ was added to the reactor. After the reaction, 195 grams of resin was recovered having an MI of 0.30 dg/min and an MIR of 47.0.

Example 2

Preparation of Cataylst Composition, Second Method

A 4.6 mmol aliquot of magnesium di-2-methylpentyloxide in heptane solution (0.96M) and 1.5 mmole of liquid titanium tetra isobutoxide were mixed in a vial to form a homogeneous solution. A 4.3 mmol aliquot of benzoyl chloride liquid was then added to this solution. An exothermic reaction took place, and a homogeneous solution was formed at the end of the reaction. This solution was injected into a vial containing a slurry made of 30 cc of hexane and 5.0 grams of Davison 948 silica gel previously dried at 500° C. The resulting mixture was allowed to react at room temperature for 30 minutes. A 19.7 mmol aliquot of trichlorosilane liquid was injected into the vial, and the mixture was allowed to react at room temperature for 30 minutes. Finally, a 1.4 mmol aliquot solution of TNHAL in heptane (0.65M) was added to the mixture at room temperature and the mixture was stirred for 30 minutes. The mixture turned brown after the addition of the TNHAL. The product was dried by first purging with nitrogen followed by evaporation vacuum.

Polymerization C

A 2.2 liter autoclave was used for the polymerization reaction. The freshly cleaned reactor was heated to 60° C. and flushed with purified nitrogen for 30 minutes. It was cooled to room temperature, and 850 cc of dried, oxygen-free hexane was added. A 0.4 cc aliquot of triethylaluminum in heptane solution (1.67M) was injected into the reactor, as a cocatalyst. The reactor was heated to 85° C. The amounts of 90 mmole of $H_2$ and 20 cc of 1-butene were added to the reactor. The reactor was then pressurized to 150 psig with ethylene. The reaction was started by injecting 50 mg of the catalyst into the reactor. The reaction was allowed to proceed for 40 minutes. At the end of the reaction period, 97.3 grams of resin was obtained having an MI of 0.8 dg/min, an MIR of 26.4, and a bulk density of 0.34 g/cc.

Examples 3-17

Preparation of Catalyst Compositions Using Second Method, and Slurry Polymerizations of Ethylene with 1-Butene Comonomer In examples 3-17, magnesium di-2-methylpentyloxide, in heptane solution, and liquid titanium tetraalkoxide were mixed in a vial to form a homogeneous solution. A 4.3 mmolar amount of liquid benzoyl chloride was then added to this solution to form a homogeneous mixture. this mixture was injected into a flask containing a slurry made of 30 cc of hexane and 5.0 grams of Davison 948 silica gel previously dried at 500° C. The resulting mixture was allowed to react at room temperature for 30 minutes. A 19.8 mmolar amount of trichlorosilane was added to the flask and allowed to react at room temperature for 30 minutes. Finally, a trialkylaluminum in heptane solution was added to the flask and allowed to react at room temperature for 30 minutes. The product was then dried by purging with nitrogen followed by evaporation under vacuum. The amount of each chemical reagent used in a particular example is given in Table I.

The titanium hydrocarbyloxide used in Examples 3–8 is titanium tetra isobutyloxide. The titanium hydrocarbyloxide used in Examples 9–17 is titanium tetra-n-butyloxide. The trialkylaluminum in Example 7 is triisobutylaluminum and in Examples 3–6 and 8–17 is tri-n-hexylaluminum.

A 2.2 liter autoclave was used for the polymerization reactions. The freshly cleaned reactor was heated to 60° C. and flushed with purified nitrogen for 30 minutes. It was then cooled to room temperature, and 850 cc of dried, oxygen-free hexane were added. Triethylaluminum in heptane solution (1.67M) was injected into the reactor, as a cocatalyst. The reactor was heated to 85° C. The reactor was then pressurized to 150 psi with ethylene. The reaction was started by injecting 50 mg of the catalyst into the reactor. The reaction was allowed to proceed for 40 minutes. The polymerization results are summarized in Table I (which also includes the results of Example 2, Polymerization C).

gel (average particle size 50 microns) previously dried at 500° C. The resulting mixture was allowed to react at room temperature for 60 minutes. The amount of 3.132 mole of liquid trichlorosilane was added to the reactor and allowed to react at room temperature for 60 minutes. The product was then dried by purging with nitrogen to a free-flowing state.

A continuous gas fluidized bed reactor was used to carry out the polymerization. The catalyst prepared as described in the preceding paragraph and a cocatalyst with Al/Ti ratio in the range of 30:1 to 60:1 were injected continuously into the fluidized bed reactor at 85° C.; 300 psi total pressure; butene-1 as comonomer; and the hydrogen as chain transfer agent. A molar ratio of 1-butene to ethylene of 0.32:1 and a molar ratio of hydrogen to ethylene of 0.005:1 were maintained during the polymerization. The reaction was run continuously and smoothly at a space time yield of 3–6 lb/hour/ft$^3$ while producing a low density polyethylene butene-1 copolymer with a 0.914–0.919 g/cc gradient density, MI of 2.1–1.2 dg/min, and bulk density of 22 lb/ft$^3$.

Example 19

The amount of 0.567 mole of magnesium di-2-methylpentyloxide in heptane solution (0.9M) and 0.232 mole of liquid titanium tetra-n-butyloxide were mixed in a bottle to form a homogeneous solution. The amount of 0.507 mole of benzoyl chloride liquid was then added to this solution to form a homogeneous solution. This mixture was injected into a reactor containing a slurry made of 4000 cc of isopentane and 801.6 g of Davison

TABLE I

| Example No. | Mg(OR)$_2$ mmol | Ti(OR)$_4$ mmol | AlR$_3$ mmol | TEAL mmol | H$_2$ mmol | Yield g | MI dg/min | MIR | Bulk Density g/cc |
|---|---|---|---|---|---|---|---|---|---|
| 2 | 4.6 | 1.5 | 1.3 | 0.7 | 90 | 97.3 | 0.8 | 26.4 | 0.34 |
| 3 | 4.6 | 1.5 | 1.3 | 1.3 | 90 | 127.2 | 1.3 | 30.6 | 0.33 |
| 4 | 4.6 | 5.9 | 1.3 | 0.7 | 120 | 93.7 | 0.9 | 26.1 | 0.31 |
| 5 | 4.6 | 5.9 | 1.3 | 1.3 | 120 | 189.2 | 1.4 | 28.1 | 0.32 |
| 6 | 4.6 | 1.5 | 1.3 | 1.3 | 80 | 136.9 | 1.4 | 29.1 | 0.34 |
| 7 | 4.6 | 1.5 | 1.3 | 13. | 80 | 111.9 | 0.8 | 25.6 | 0.34 |
| 8 | 4.6 | 1.5 | 1.7 | 0.7 | 90 | 106.6 | 0.3 | 28.5 | 0.34 |
| 9 | 4.6 | 1.5 | 1.3 | 1.3 | 80 | 135.6 | 1.1 | 25.3 | 0.35 |
| 10 | 4.6 | 1.5 | 0.7 | 1.3 | 80 | 90.5 | 0.5 | 25.3 | 0.27 |
| 11 | 4.6 | 1.5 | 0.7 | 2.7 | 80 | 122.3 | 1.2 | 25.0 | 0.28 |
| 12 | 4.6 | 7.5 | 1.3 | 1.3 | 80 | 168.4 | 1.3 | 26.4 | 0.30 |
| 13 | 4.6 | 7.5 | 2.6 | 1.3 | 80 | 178.2 | — | — | — |
| 14 | 4.6 | 1.5 | 2.0 | 1.3 | 80 | 135.9 | 1.9 | 27.0 | 0.32 |
| 15 | 4.6 | 1.5 | 2.0 | 1.3 | 80 | 156.9 | 0.9 | 28.0 | 0.31 |
| 16 | 4.6 | 1.5 | 2.6 | 1.3 | 80 | 122.0 | 0.8 | 26.9 | 0.36 |
| 17 | 4.6 | 1.5 | 2.6 | 1.3 | 80 | 163.3 | 1.2 | 27.5 | 0.34 |

A dash signifies no determination was made

In all of Examples 2–17 except Examples 4, 5, 12, and 13, the Mg/Ti ratio remains constant at 3.1. In Examples 2,3, 6, 7 and 9 the Al/Ti ratio remains constant at 0.9.

Example 18

Preparation of Catalyst Composition Using Second Method and Use of the Catalyst in Gas Phase Fluid Bed Polymerizations of Ethylene with 1-Butene Comonomer An 0.774 mole aliquot of magnesium di-2-methylpentyloxide in heptane solution (0.9M) and 0.232 mole of liquid titanium tetra-n-butyloxide were mixed in a bottle to form a homogeneous solution. The amount of 0.693 mole of liquid benzoyl chloride was then added to this solution to form a homogeneous mixture. This mixture was injected into a reactor containing a slurry made of 4000 cc of isopentane and 791.4 g of Davison 948 silica 948X silica gel (average particle size 30 microns) previously dried at 500° C. The resulting mixture was allowed to react at room temperature for 60 minutes. The amount of 3.183 mole of trichlorosilane was added to the reactor and allowed to react at room temperature for 60 minutes. Finally, 0.414 mole of TNHAL in heptane solution (0.65M) was added to the reactor and allowed to react at room temperature for 60 minutes. The product was then dried by purging with nitrogen to a free-flowing state. The catalyst was used to copolymerize ethylene and butene-1 under similar condition as Example 18. A low density polyethylene butene-1 copolymer with 0.917–0.918 g/cc gradient density, MI of 0.6–1.4 dg/min and a bulk density of 27 lb/ft$^3$ was produced.

A copolymer material was produced under an a molar ration of 1-butene to ethylene (C$_4$/C$_2$) of 0.32:1 and a molar ratio of hydrogen to ethylene (H$_2$/C$_2$) of 0.045:1 to provide the material with a gradient density (d) of 0.918 g/cc and a melt index (MI) of 1.0 for purposes of comparison to the copolymer material produced in Example AA. The polymerization result of Example 19 is favorably compared with that of Example AA in Table II.

TABLE II

| Example | Productivity lb/lb | C$_4$/C$_2$ For 0.918 D | H$_2$/C$_2$ For 1 MI | Resin APS(") | Bulk D pcf |
|---|---|---|---|---|---|
| 19 | 7500 | 0.32 | 0.045 | 0.036 | 27.8 |
| AA | 2500 | 0.42 | 0.070 | 0.027 | 27.8 |

Example 20

Preparation of Catalyst Composition, Second Method, Including Use of Magnesium Dialkoxide Synthesized In Situ The amount of 8.9 mmol of liquid 2-ethylhexanol was added slowly into a vial containing 4.5 mmole of ethylbutylmagnesium in heptane solution (0.62M). A highly exothermic reaction took place immediately, forming a viscous solution. The amount of 1.5 mmol liquid titanium isobutoxide was added to this solution, forming a less viscous solution. The amount of 4.3 mmol liquid benzoyl chloride was then added. An exothermic reaction took place, and a homogeneous solution was formed at the end of the reaction. This solution was injected into a vial containing a slurry made of 30 cc of hexane and 5.0 grams of Davison 948 silica gel previously dried at 500° C. The resulting mixture was allowed to react at room temperature for 30 minutes. The amount of 19.7 mmole of liquid trichlorosilane was injected into the vial and the mixture was allowed to react at room temperature for 30 minutes. Finally, 1.4 mmole of TNHAL in heptane solution (0.65M) was added to the mixture at room temperature and the mixture was stirred for 30 minutes The mixture turned brown after the addition of TNHAL. The product was dried by first purging with nitrogen followed by evaporation under vacuum.

Polymerization D

The polymerization was carried out under similar conditions as polymerization C. At the end of the reaction period, 112 grams of resin is obtained with an MIR of 1.10 dg/min and a 27.8 MIR.

The foregoing examples and description are set forth to illustrate the invention without limiting the scope of the invention, and various modifications and changes may be made which are within the spirit and scope of the invention as set forth in the following claims.

I claim:

1. A supported catalyst for polymerization of α-olefins, comprising first and second catalyst components, said first catalyst component being formed by reacting a halogen-containing compound of the formula:

$$H_a M^1 X^1{}_b R^1{}_{(c-b-a)}$$

wherein

M$^1$ is boron, carbon, silicon or mixtures thereof, X$^1$ is a halogen,

R$^1$ is a hydrocarbyl or an alkoxy radical having 1 to 20 carbon atoms,

"a" is zero when M$^1$ is boron and is a number greater than zero and less than or equal to 2 when M$^1$ is silicon or carbon, "b" is a number equal to or greater than 1 when M$^1$ is boron and greater than 1 when M$^1$ is silicon, carbon, and "c" is the maximum valency of the element M$^1$, with a mixture produced by contacting a porous inorganic oxide support in an inert solvent with a solution made by combining a magnesium dihydrocarbyloxide dissolved in an inert solvent, and of the formula:

$$Mg(OR^2)_2$$

wherein

R$^2$ is the same or different and is a hydrocarbyl radical containing at least 6 carbon atoms, with a transition metal hydrocarbyloxide of the formula $$M^2(OR^3)_y$$

wherein

M$^2$ is a transition metal from Group IVB, VB and VIB of the Periodic Table,

"y" is the valency of the metal M$^2$, and

R$^3$ is the same or different and is a hydrocarbyl radical containing 1 to 20 carbon atoms, said halogen-containing compound being reacted with said mixture at a molar ratio of from about 100 to 0.1 mols per mol of said magnesium dihydrocarbyloxide and transition metal hydrocarboxyloxide, said oxide support being used in an amount of from about 1 to about 10,000 parts by weight of the oxide to weight of transition metal, and said magnesium dihydrocarbyloxide being combined with said transition metal hydrocarbyloxide compound at an Mg/M$^2$ molar ratio of from about 0.5 to 50, said second catalyst component being an organometal compound of the formula:

$$M^3 R^4{}_{e-f} X_f$$

wherein

M$^3$ is aluminum, magnesium, zinc or mixtures thereof,

R$^4$ is a saturated hydrocarbyl radical having from 1 to 14 carbon atoms,

X is hydrogen, a halogen or an alkoxy radical,

"e" is the valency of the metal M$^3$, and "f" is a number from zero to e−1, said second catalyst component being present in the amounts of from about 0.5 to about 5 mols per mol of transition metal hydrocarbyloxide.

2. The catalyst of claim 1 in which, in said halogen-containing compound, M$^1$ is Si, X is Cl and R$^1$ is an alkyl group having from 1 to 6 atoms.

3. The catalyst of claim 1 in which, in said halogen-containing compound, M$^1$ and R$^1$ is a single carbon hydrocarbyl radical.

4. The catalyst of claim 1 in which, in said halogen-containing compound, M$^1$ is B, X is Cl, and R$^1$ is an alkyl group having from 1 to 6 carbon atoms.

5. The catalyst of claim 1 in which said dissolved magnesium dihydrocarbyloxide is a reaction product produced by reacting an alkyl alcohol containing at least 6 carbon atoms with a magnesium dialkyl dissolved in an inert solvent at a ratio of about two mols of alkyl alcohol per mol of magnesium dialkyl.

6. The catalyst of claim 1 in which said transition metal hydrocarbyloxide compound is a titanium tetraalkoxide.

7. The catalyst of claim 1 in which said halogen-containing compound is a chlorosilane, said magnesium dihydrocarbyloxide is a magnesium dialkoxide, and said transition metal hydrocarbyloxide is a titanium tetraalkoxide.

8. The catalyst of claim 7 in which said chlorosilane is trichlorosilane.

9. The catalyst of claim 8 in which said magnesium dihydrocarbyloxide is magnesium di-2-methylpentyloxide and said titanium tetraalkoxide is titanium tetra-n-butyloxide.

10. The catalyst of claim 7 in which said porous inorganic support is finely divided particulate silica or silica-aluminum and has a particle diameter of from 10 to 200 microns, a pore volume of 0.1 to 5.0 cm$^3$/g, and a surface area of from 10 to 1,000 m$^2$/g.

11. A process for preparing a supported catalyst composition for polymerization of α-olefins which comprises (a) combining a magnesium dihydrocarbyloxide, dissolved in an inert solvent, and of the formula:

$$Mg(OR^2)_2$$

wherein
R$^2$ is the same or different and is a hydrocarbyl radical containing at least 6 carbon atoms,
with a transition metal hydrocarbyloxide of the formula:

$$M^2(OR^2)_y$$

wherein
M$^2$ is a transition metal from Group IVB, VB and VIB of the Periodic Table,
"y" is the valency of the metal M$^2$, and
R$^3$ is the same or different and is a hydrocarbyl radical containing 1 to 20 carbon atoms,
to produce a first solution, the respective amounts of each of said magnesium dihydrocarbyloxide and transition metal hydrocarbyloxide being such that the mol ratio of Mg/M$^2$ in said solution is from about 0.5 to about 50, (b) combining said first solution with a finely divided porous inorganic oxide support in an inert solvent to produce a slurry mixture, said support being present in from about 1 to about 10,000 parts by weight of said transition metal, (c) combining with the slurry mixture of step (b) a halogen-containing compound of the formula $$H_aM^1X^1_bR^1_{(c-b-a)}$$

wherein
M$^1$ is boron, carbon, silicon or mixtures, thereof,
X$^1$ is a halogen,
R$^1$ is a hydrocarbyl radical having 1 to 20 carbon atoms, "a" is zero when M$^1$ is boron and is a number greater than zero and less than or equal to 2 when M$^1$ is silicon or carbon,
"b" is a number equal to or greater than 1 when M$^1$ is boron and greater than 1 when M$^1$ is silicon or carbon, and
"c" is the maximum valency of the element M$^1$, for a period of time effective to permit substantial completion for a period of time effective to permit substantial completion of reaction with the halogen-containing compound to produce a slurry reaction mixture, and (d) adding to the slurry reaction mixture of step (d), an organometal compound, dissolved in an inert solvent, and of the formula:

$$M^3R^4_{e-f}X_f$$

wherein
M$^3$ is aluminum, magnesium, zinc or mixtures thereof,
R$^4$ is a saturated hydrocarbyl radical having from 1 to 14 carbon atoms,
X is hydrogen, a halogen or an alkoxy radical,
"e" is the valency of the metal M$^3$, and "f" is a number from zero to e−1,
in an amount of from about 0.5 to about 5.0 mols per mol of said transition metal hydrocarbyloxide, to produce the catalyst composition.

12. The process of claim 11 in which, in said halogen-containing compound, M$^1$ is Si, X is Cl and R$_1$ is an alkyl group having from 1 to 6 carbon atoms.

13. The process of claim 11 in which, in said halogen-containing compound, M$^1$ is C and R$^1$ is a single carbon hydrocarbyl radical.

14. The process of claim 11 in which, in said halogen-containing compound, M$^1$ is B, X is Cl, and R$^1$ is an alkyl group having from 1 to 6 carbon atoms 15. The process of claim 11 in which said dissolved magnesium dihydrocarbyloxide is a reaction product produced by reacting an alkyl alcohol containing at least 6 carbon atoms with a magnesium dialkyl dissolved in an inert solvent at a ratio of about two mols of alkyl alcohol per mol of magnesium dialky.

16. The process of claim 11 in which said transition metal hydrocarbyloxide compound is a titanium tetraalkoxide.

17. The process of claim 11 in which said halogen containing compound is a chlorosilane, said magnesium dihydrocarbyloxide is a magnesium dialkoxide, and said transition metal hydrocarbyloxide is a titanium tetraalkoxide.

18. The process of claim 10 in which said chlorosilane is trichlorosilane.

19. The process of claim 18 in which said magnesium dihydrocarbyloxide is magnesium di-2-methylpentyloxide and said titanium tetraalkoxide is titanium tetra-n-butyloxide.

20. The process of claim 17 in which said porous inorganic support is finely divided particulate silica or silica-aluminum and has a particle diameter of from 10 to 200 microns, a pore volume of 0.1 to 5.0 cm$^3$/g, and a surface area of from 10 to 1,000 m$^2$/g.

* * * * *